United States Patent [19]

Okino

[11] Patent Number: 4,692,013
[45] Date of Patent: Sep. 8, 1987

[54] CAMERA INCORPORATING FLASH UNIT
[75] Inventor: Tadashi Okino, Tokyo, Japan
[73] Assignee: Canon Kabushiki Kaisha, Tokyo, Japan
[21] Appl. No.: 736,977
[22] Filed: May 22, 1985

Related U.S. Application Data

[63] Continuation of Ser. No. 536,352, Sep. 27, 1983, abandoned.

[30] Foreign Application Priority Data

Sep. 29, 1982 [JP] Japan .................................. 57-170629

[51] Int. Cl.$^4$ .............................................. G03B 15/05
[52] U.S. Cl. .................................. 354/413; 354/145.1; 354/149.11
[58] Field of Search ..................... 354/129, 132, 145.1, 354/149.11, 414–417, 421, 141, 413, 127.13

[56] References Cited

U.S. PATENT DOCUMENTS 3,810,212  5/1974  Biber .............................. 354/127.12
4,354,751 10/1982  Izumi et al. ...................... 354/145.1
4,415,247 11/1983  Takematsu ..................... 354/149.11

FOREIGN PATENT DOCUMENTS

88438  6/1982  Japan .............................. 354/149.11

Primary Examiner—W. B. Perkey
Attorney, Agent, or Firm—Toren, McGeady & Associates

[57] ABSTRACT

A camera having a flash device incorporated therein is arranged to permit use of either the incorporated internal flash unit or a detachable external flash unit. The camera is provided with a change-over switch arrangement which is operated, when the detachable flash unit is mounted on the camera, to render the incorporated flash unit, inoperative and the detachable flash unit operative. When an object to be photographed is located at a distance too far for the flash light quantity obtainable from the incorporated flash unit, the detachable flash unit which is capable of emitting a greater flash light quantity than the incorporated flash unit is used.

16 Claims, 5 Drawing Figures

FIG.5

CAMERA INCORPORATING FLASH UNIT

This is a continuation of application Ser. No. 536,352, filed Sept. 27, 1983, now abandoned.

BACKGROUND OF THE INVENTION

1. Field of the Invention

This invention relates to a camera having a flash unit incorporated therein and more particularly to a camera which not only incorporates the flash unit therein but also permits use of an external flash unit according to a distance to an object to be photographed.

2. Description of the Prior Art

It has recently become possible to take a flash light photograph easily indoors or in a dark place with a compact camera having a flash unit incorporated therein. Especially, a compact camera of the type having an incorporated flash unit in combination with an automatic focusing function and a so-called flash-auto function which adjusts an aperture according to a photographing distance enables the photographer to take a flash light picture without any complex setting operation at all.

However, since the portability is most important for the compact cameras of this kind, they are generally provided with a small incorporated flash unit capable of emitting flash light in small quantity (a small guide number) while the lens used for the camera is also small and relatively dark (a large min. F-number). Accordingly, the range of distances to photographing objects for which such compact cameras of the prior art are usable for flash photography has been very much limited.

SUMMARY OF THE INVENTION

It is therefore a general object of the present invention to solve the above-stated problem presented by the compact cameras of the prior art.

It is another object of the invention to provide a camera which has a flash unit incorporated therein and which is not only capable of broadening the flash photographable range to a great extent but also minimizes the loss of a redundant energy.

It is a further object of the invention to provide a flash unit incorporating camera which is not only capable of attaining the above-stated objects but excels also in operability.

It is a feature of the flash unit incorporating camera according to the present invention that the camera is arranged to permit use of an external detachable flash unit capable of emitting a large flash light quantity by mounting it on the camera according to the conditions of objects to be photographed.

These and further objects and features of the invention will become apparent from the following detailed description of preferred embodiments thereof taken in connection with the accompanying drawings.

DETAILED DESCRIPTION OF THE PREFERRED EMBODIMENT

Figure 1:
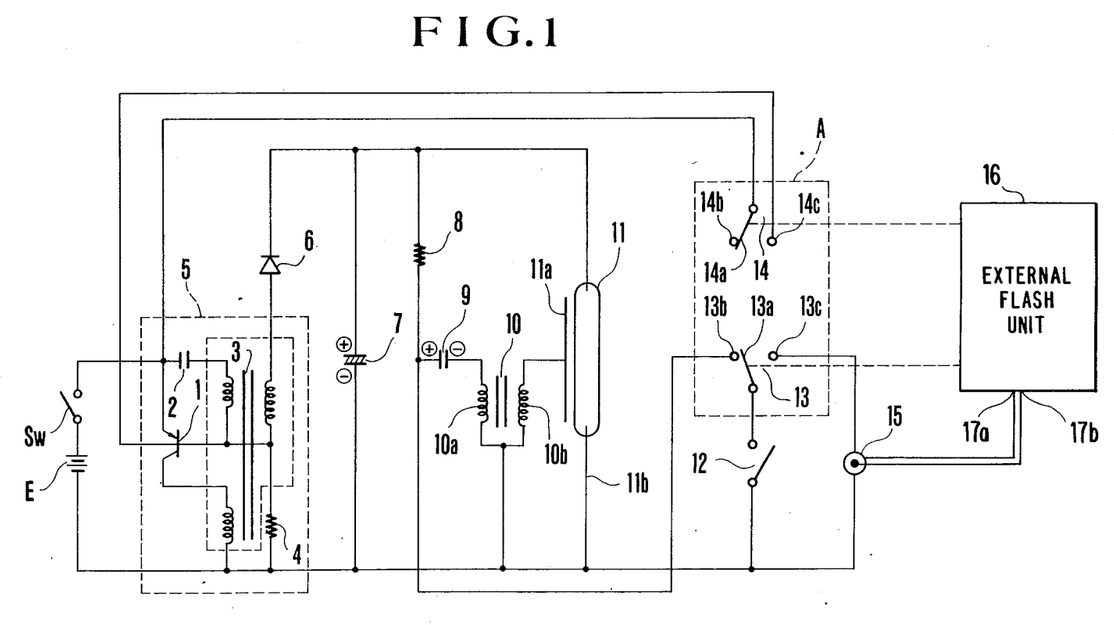
FIG. 1 is a circuit diagram showing a camera incorporating a flash unit therein according to the present invention as a first embodiment thereof.
Figure 2:
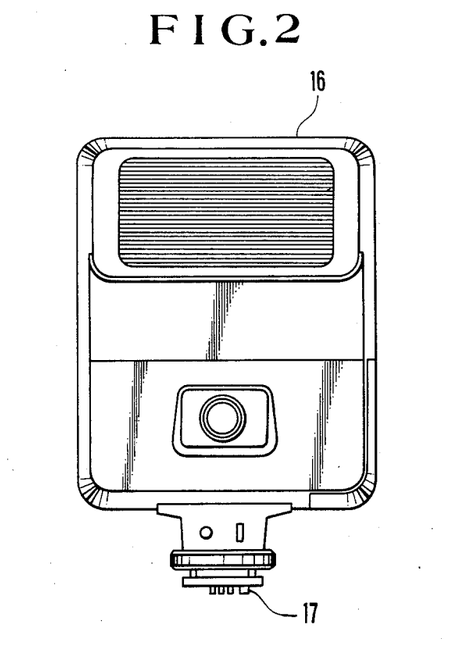
FIG. 2 is an illustration of the appearance of a detachable flash unit which is mountable on the camera of FIG. 1.

FIG. 1 is a circuit diagram showing an electronic flash unit incorporated into a camera according to the present invention as an embodiment thereof. An oscillating booster circuit 5, which consists of a transistor 1, a capacitor 2, an oscillating transformer 3 and a resistor 4, is connected to a power source E. The output terminal of the oscillating booster circuit, 5 is connected to a main capacitor 7 via a diode 6. A series circuit consisting of a resistor 8, a trigger capacitor 9 and a primary winding 10a of a trigger transformer 10, and a flash tube 11 are connected in parallel with the main capacitor 7. A secondary winding 10b of the trigger transformer 10 is connected between a trigger electrode 11a and a cathode 11b of the flash tube 11. Switches 13 and 14, which are encompassed with a broken line A in the drawing, are arranged to operate in response to mounting and dismounting of an external detachable flash unit 16, which looks as shown in FIG. 2. The circuit arrangement of this detachable flash unit 16 is similar to a circuit disclosed by U.S. Pat. No. 3,921,034 (issued Nov. 18, 1975) and therefore, is omitted from description here. The embodiment includes a known synchronizing switch 12 which is arranged to produce a trigger signal. The switch 13 consists of a moving contact piece 13a and fixed terminals 13b and 3c. The moving contact piece 13a is connected to a negative electrode of the power source E via the synchronizing switch 12 of the camera. The fixed terminal 13b is connected to a connection point between the resistor 8 and the trigger capacitor 9. The fixed terminal 13c is connected to one electrodes of an external synchronizing terminal 15 which is provided for connection with the external detachable flash unit 16. The other electrode of the external synchronizing terminal 15 is connected to the negative electrode of the power source E. In case that the external detachable flash unit 16 is similar to the above-stated flash device, disclosed by U.S. Pat. No. 3,921,034, one of the electrodes of the terminal 15, which is connected to the fixed terminal 13c, is connected to a terminal 17a of the detachable flash unit 16, while the other electrode of the terminal 15 is connected to a terminal 17b thereof, both terminals 17a and 17b being arranged as disclosed in U.S. Pat. No. 3,921,034. In other words, with the detachable flash unit 16 mounted on the camera, the terminal 15 is parallel connected to a trigger circuit of the detachable flash unit 16 (see a trigger circuit of the flash device disclosed in U.S. Pat. No. 3,921,034). The switch 14 also consists of a moving contact 14a and fixed terminals 14b and 14c. The moving contact 14a is connected to the emitter of the transistor 1. The fixed terminal 14b is in an open state while the other fixed terminal 14c is connected to the base of the transistor 1. Mounting and dismounting of the detachable flash unit 16 which is to be used for obtaining a larger flash light quantity, in relation to the switching operations of the switches 13 and 14 are as follows: When the detachable flash unit 16 is not mounted, the moving contact piece 13a is connected to the fixed terminal 13b and the moving contact piece 14a to the fixed terminal 14b. When the detachable flash unit 16 is mounted, the moving contact piece 13a is connected to the fixed terminal 13c and the moving contact piece 14a to the fixed terminal 14c. Further, the embodiment is provided with an exposure light quantity control circuit and a charge completion detection circuit which are known, for example, from U.S. Pat. No. 4,153,355 (published May 8, 1979) etc. Therefore, these circuits are omitted from description here.

With the embodiment arranged as described above, the elements E and 1–12, which constitute the flash unit are disposed within the camera while the elements 13–15 are disposed on the outside of the camera.

The embodiment operates as follows: In case that the external detachable flash unit 16 for a larger flash light quantity is not mounted on the camera, the switches 13 and 14, respectively, have their moving contact pieces 13a and 14a connected to the fixed terminals 13b and 14b as mentioned above. Therefore, the synchronizing switch 12 is connected to the switch circuit A. The part between the base and emitter of the transistor 1 is not short-circuited under that condition. When the power source switch SW is turned on, the oscillating booster circuit 5 operates to cause the main capacitor 7 to be charged to the polarity as shown in FIG. 1. Then, the trigger capacitor 9 is also charged up to about the same voltage as the charge voltage of the main capacitor 7 to the polarity as shown in the drawing.

After the charge voltage of the main capacitor 7 has reached a sufficiently high value for flashing by the flash tube 11, when the synchronizing switch 12 turns on in response to an operation on a shutter release button which is not shown, an opening action of a shutter, etc., the electric charge of the trigger capacitor 9 is discharged via the switch 13, synchronizing switch 12 and the primary winding 10a of the trigger transformer 10. At that instant, a high voltage 9 which is produced at both ends of the secondary winding 10b of the trigger transformer 10, is impressed between the trigger electrode 11a and the cathode 11b of the flash tube 11. As a result of that, the flash tube 11 is ionized and flashes.

In the event that, in photographing a scene located at a relatively long distance, the external detachable flash unit 16 of FIG. 2, which is capable of emitting a larger flash light quantity (or which is of a larger guide number) than the flash unit of FIG. 1, is mounted on the camera of FIG. 1, the embodiment operates as follows: With the detachable flash unit 16 mounted on the camera, a leg part 17, which is shown in FIG. 2, pushes the switches 13 and 14 to have their moving contact pieces 13a and 14a connected to their fixed terminals 13c and 14c. With the moving contact piece 13a thus connected to the fixed terminal 13c, the synchronizing switch 12 is electrically separated from the flash unit circuit of FIG. 1 and is connected to the external synchronizing terminal 15. Further, with the moving contact piece 14a connected to the fixed terminal 14c, the part between the base and emitter of the transistor 1 is short-circuited to render the oscillating booster circuit 5 inoperative. Since the oscillating booster circuit 5 is thus rendered inoperative, the main capacrtor 7 becomes no longer chargeable when the detachable flash unit 16 is mounted. Further, even if there is some residual voltage at the capacitor when the camera is shifted to the use of the detachable flash unit, the flash unit arranged within the camera as shown in FIG. 1 never comes to flash even if the synchronizing switch 12 is turned on, because the switch 12 is separated from the flash unit circuit. Meanwhile, since the synchronizing switch 12 is connected to the external synchronizing terminal 15 in this instance, the detachable flash unit 16 flashes when the switch 12 turns on.

Figure 3:
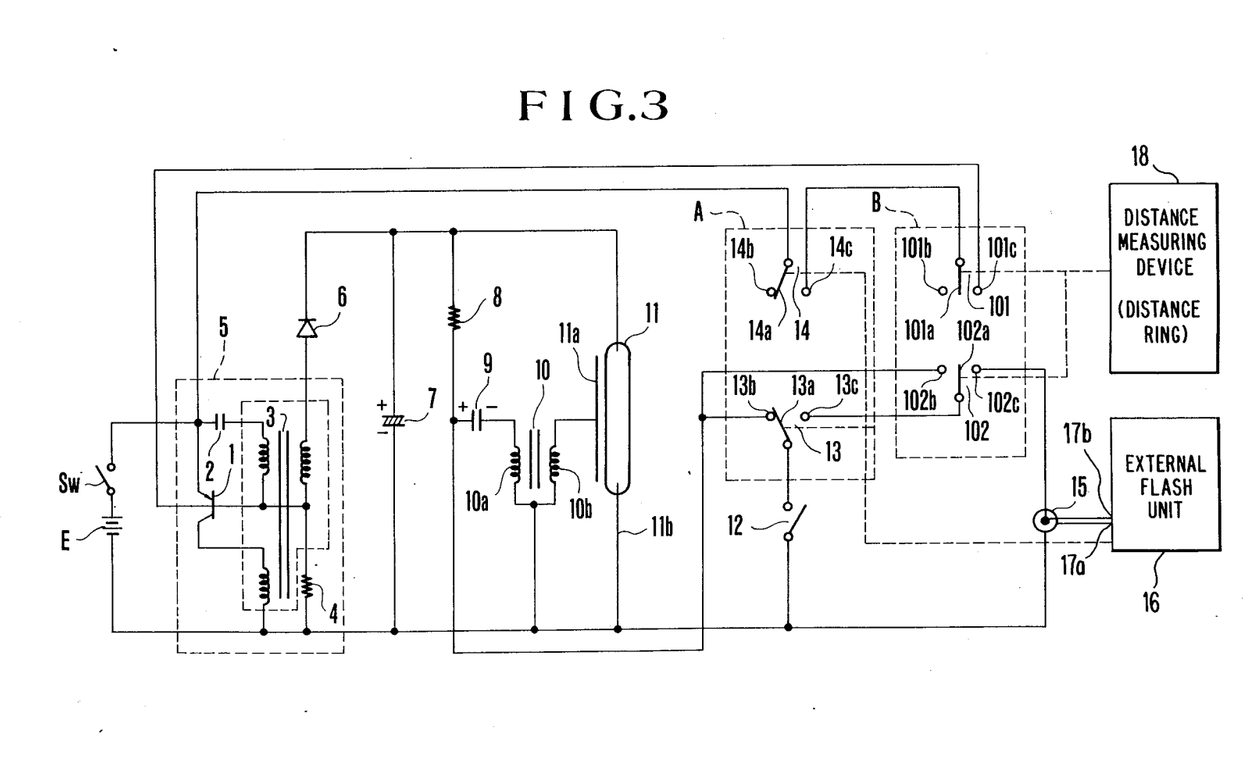
FIG. 3 is a circuit diagram showing a flash unit arranged according to the invention as another embodiment thereof.

Another example of a camera incorporating a flash unit therein in accordance with this invention is arranged as shown in a circuit diagram in FIG. 3. In this case, switches 101 and 102, which are encompassed with a broken line B in FIG. 3, are is added to the arrangement of the preceding embodiment example shown in FIG. 1. The switches 101 and 102 are arranged to operate in response to a signal from a distance measuring device 18 (or, alternately, in response to a distance ring of a lens). The switch 101 consists of a moving contact piece 101a and fixed terminals 101b and 101c. The fixed terminal 101b is in an open state while the other fixed terminal 101c is connected between the fixed terminal 14c of the switch 14 and the base of the transistor 1 by cutting a line which is shown as connecting the terminal 14c to the base of the transistor in the case of FIG. 1. The other switch 102 consists of a moving contact piece 102a and fixed terminals 102b and 102c. The fixed terminal 102b is connected to the fixed terminal 13b of the switch 13. The moving contact piece 102a and the fixed terminal 102c are connected between the fixed terminal 13c of the switch 13 and the external synchronizing terminal 15 by cutting a line which connects the terminal 13c to the synchronizing terminal 15 in the case of FIG. 1. The switching operations of the switches 101 and 102 are as follows: In case that an object to be photographed is located at a relatively short distance and an adequate flash light quantity is obtainable from the internal or incorporated flash unit shown in FIG. 3, the moving contact piece 101a is connected to the fixed terminal 101b and the moving contact piece 102a to the fixed terminal 102b. Whereas, in case where an object to be photographed is located at a relatively long distance and an adequate flash light quantity is hardly obtainable from the internal flash unit, the moving contact piece 101a is connected to the fixed terminal 101c and the moving contact piece 102a to the fixed terminal 102c.

Description of the operation of the embodiment shown in FIG. 3 is as follows with stress put mainly on differences thereof from that of the preceding embodiment example shown in FIG. 1: When the external detachable flash unit 16, which is capable of emitting a larger flash light quantity than the internal flash unit shown in FIG. 3, is not mounted on the camera, the switches 13 and 14, respectively, have their moving contact pieces 13a and 14a connected to their fixed terminals 13b and 14b. The synchronizing switch 12 is connected solely to the side of the internal flash unit shown in FIG. 3 irrespective of the positions of the switches 101 and 102 and is not connected to the external synchronizing terminal 15. The part between the base and emitter of the transistor 1 is never short-circuited under that condition. Therefore, a photographing operation is performed with the flash unit of FIG. 3 in the same manner as in the case of the flash unit shown in FIG. 1.

In the event that the external detachable flash unit 16 shown in FIG. 2 is mounted on the camera while an object to be photographed is located at a distance which can be sufficiently covered with the flash light quantity available from the internal (or incorporated) flash unit shown in FIG. 3, the moving contact piece 14a of the switch 14 is connected to the fixed terminal 14c by the leg part 17 of the external or detachable flash unit 16 shown in FIG. 2. Meanwhile, however, the moving contact piece 101a of the switch 101 is connected to the fixed terminal 101b to prevent the part between the base and emitter of the transistor 1 from being short-circuited. Meanwhile, the leg part 17 of the detachable flash unit 16 also causes the moving contact piece 13a of the switch 13 to be connected to the fixed terminal 13c and the moving contact piece 102a of the switch 102 to the fixed terminal 102b. Therefore, the synchronizing switch 12 is connected to the side of the internal flash unit shown in FIG. 3 and is separated from the external synchronizing terminal 15. Accordingly, a photographing operation in this case is also performed with the flash unit of FIG. 3.

In case where the above-stated external detachable flash unit 16, which is capable of emitting the larger flash light quantity, is mounted on the camera while an object to be photographed is located too far for obtaining an adequate exposure light quantity from the internal flash unit shown in FIG. 3 (hereinafter such a distance to the object will be called the distance A), the embodiment operates as follows: In this case, the moving contact piece 14a of the switch 14 is connected to the fixed terminal 14c. The moving contact terminal 101c by a member (not shown) attached to the distance ring 18 which terminal 101c by a member attached to a distance ring which is known and requires no special description here. It goes without saying that the above-stated member is so arranged that when the distance ring 18 is turned to a position corresponding to the above-stated distance A, the member moves the moving contact piece 101a of the switch 101 to the fixed terminal 101c and the moving contact piece 102a of the switch 102 to the fixed terminal 102c. Since the part between the base and emitter of the transistor 1 is then short-circuited, the oscillating booster circuit 5 is rendered inoperative. With the moving contact piece 13a of the switch 13 connected to the fixed terminal 13c and the moving contact piece 102a of the switch 102 to the fixed terminal 102c in this instance, the synchronizing switch 12 is separated from the flash unit shown in FIG. 3 and is connected to the external synchronizing terminal 15. Accordingly, photographing in this instance is performed with the external flash unit 16 for a larger flash light quantity.

In short, in the case of the embodiment shown in FIG. 3, photographing is performed with the external flash unit 16 for a larger flash light quantity only when an object to be photographed is located at a relatively long distance with the external flash unit 16 capable of producing a larger flash mounted on the camera. With the exception of such an instance, photographing is always performed with the internal camera incorporated into the camera even when the external detachable flash unit 16 for a larger flash light quantity is mounted on the camera.

In case where the external detachable flash unit 16 for a larger flash light quantity is selected from the so-called computer type electronic flash units arranged to determine a time for terminating a flashing operation by receiving a reflection light from an object to be photographed in such a manner as disclosed by U.S. Pat. No. 4,047,194 (published Sept. 6, 1977) and another U.S. Pat. No. 4,007,398 (published Feb. 8, 1977) the camera to be used in combination with such an external flash unit 16 is preferably of the type having the aperture of its photo-taking lens fixed at a certain given value in such a manner as disclosed by the above-stated U.S. Pat. No. 4,047,194.

Figure 4:
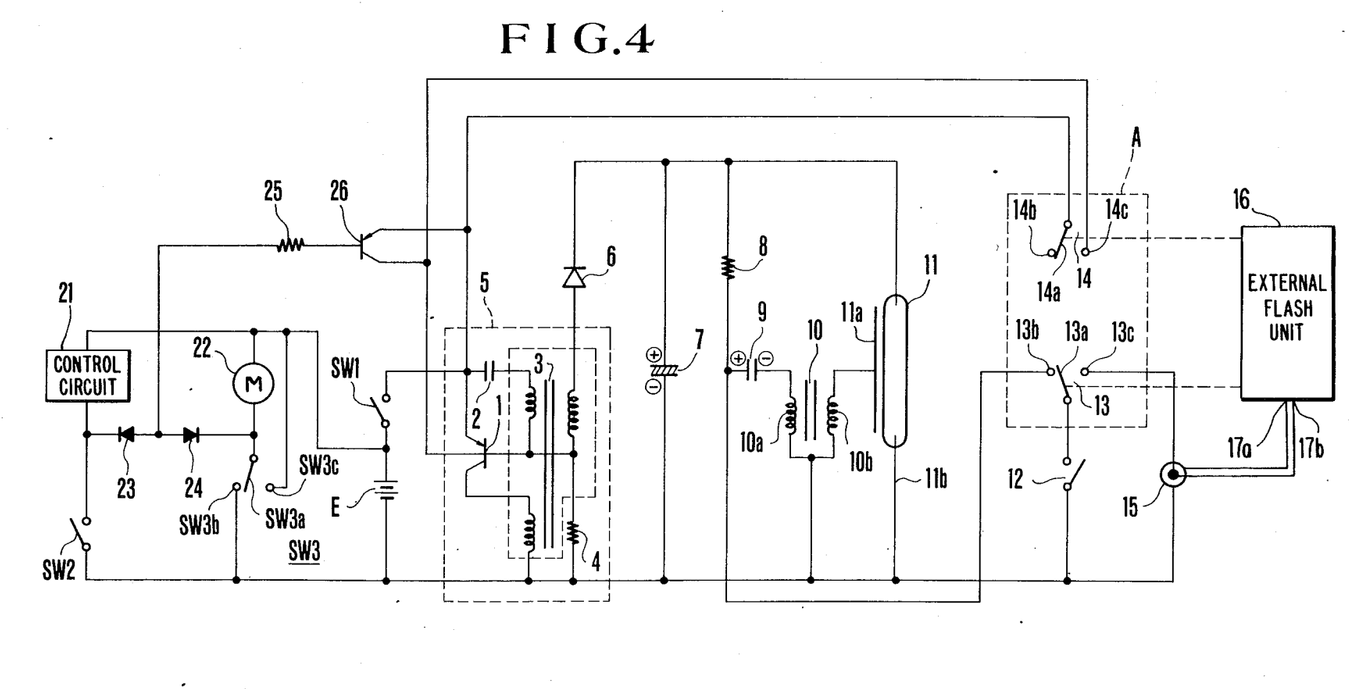
FIG. 4 is a circuit diagram showing a third embodiment of the invention.

FIG. 4 shows, in a circuit diagram, a flash unit incorporating camera as a third embodiment example of the present invention. Since the circuit arrangement is similar to that of the camera shown in FIG. 1, the following description will cover only the different points of the embodiment from the embodiment shown in FIG. 1.

A power source switch SW1 for the flash unit is series connected to the power source E. Meanwhile, a series circuit, consisting of a known camera control circuit 21 and a power source switch SW2 for the camera control circuit, and another series circuit, consisting of a film winding motor 22 and a film winding motor control switch SW3, are respectively connected in parallel with the power source E. When the power source switch SW2 for the camera control circuit is turned on, power supply is effected from the power source E to render the camera control circuit 21 operative. The switch SW3 consists of a moving contact piece SW3a and fixed contact pieces SW3b and SW3c. The moving contact piece SW3a is connected to one of the electrodes of the winding motor 22, the fixed contact piece SW3b to the negative electrode of the power source E and the fixed contact piece SW3c to the positive electrode of the power source E. The moving contact piece SW3a is normally connected to the fixed contact piece SW3c. The embodiment includes diodes 23 and 24. The cathodes of these diodes 23 and 24 are respectively connected to a connection point between the camera control circuit 21 and the switch SW2 and to a connection point between the film winding motor 22 and the moving contact piece SW3a of the switch SW3. The anodes of the diodes 23 and 24 are interconnected and are connected to the base of a transistor 26 via a resistor 25. The transistor 26 is a pnp transistor having its emitter connected to the emitter of the transistor 1 and its collector to the base of the transistor 1. The embodiment operates in the following manner:

Let us first consider an instance where the external flash unit 16 of a larger flashing capacity is not mounted on the camera. In this instance, the switches 13 and 14 have their moving contact pieces 13a and 14a respectively connected to the fixed terminals 13b and 14b. Therefore, the synchronizing switch 12 is connected to the circuit of the camera shown in FIG. 4. The part between the base and emitter of the transistor 1 is not short-circuited. When the power source switch SW1 is turned on, the oscillating booster circuit 5 begins to operate to charge the main capacitor 7 to the polarity indicated in the drawing. Then, the trigger capacitor 9 is also charged up to about the same voltage as the charge voltage of the main capacitor 7 and also to the polarity indicated.

When the switch SW2 is turned on with the charge voltage of the main capacitor 7 having reached a value sufficient for allowing the flash tube 1 to flash, the camera control circuit 21 becomes operative. With the switch SW2 turned on, a base current is supplied to the transistor 26 via the resistor 25, the diode 23 and the switch SW2. The transistor 26 turns on to cut off the transistor 1 by short-circuiting the part between the base and emitter of the transistor 1 which is disposed within the oscillating booster circuit 5. As a result, the operation of the oscillating booster circuit 5 comes to a stop. Further, when a shutter release button (not shown) of the camera is pushed, the synchronizing switch 12 turns on after commencement of an exposure of a film which is not shown. With the synchronizing switch 12 turned on, the electric charge of the trigger capacitor 9 is discharged via the switch 13, the synchronizing switch 12 and the primary winding 10a of the trigger transformer 10. At that instant, a high voltage which is produced at both ends of the secondary winding 10b of the trigger transformer 10 is impressed between the trigger electrode 11a and the cathode 11b of the flash tube 11. This ionizes the flash tube 11 and causes it to flash.

Upon completion of an exposure, the shutter is closed and the switch SW2 turns off. After that, the moving contact piece SW3a of the switch SW3 is connected to the fixed contact piece SW3b to effect power supply to the film winding motor 22. The film is then wound up by the motor 22.

Upon completion of film winding, the moving contact piece SW3a of the switch SW3 is again connected to the fixed contact piece SW3c. The power supply to the film winding motor 22 is brought to a stop. At the same time, the base current to the transistor 26 is cut off to again render the oscillating booster circuit operative.

Next, in the event that the external detachable flash unit 16, which is shown in FIG. 2 and is of a larger flashing capacity than that of the internal flash unit, is mounted on the camera, the embodiment operates in the following manner: In that instance, the switches 13 and 14 have their moving contact pieces 13a and 14a respectively connected to their fixed terminals 13c and 14c. With the moving contact piece 13a connected to the fixed terminal 13c, the synchronizing switch 12 is separated from the circuit shown in FIG. 4 and is connected to the external synchronizing terminal 15. Meanwhile, with the moving contact piece 14a connected to the fixed terminal 14c, the part between the base and emitter of the transistor 1 is short-circuited to render the oscillating booster circuit inoperative. Since the oscillating booster circuit 5 thus becomes inoperative, the main capacitor 7 becomes no longer chargeable. Even if there is some residual voltage at the main capacitor 7 when the camera is thus shifted to the use of the external flash unit, the internal flash unit never comes to flash even if the synchronizing switch 12 turns on because the switch 12 is separated from the circuit of the internal flash unit. Meanwhile, since the synchronizing switch 12 is connected to the external synchronizing terminal 15, closing of the switch 12 causes the external flash unit to flash in synchronism therewith.

Figure 5:
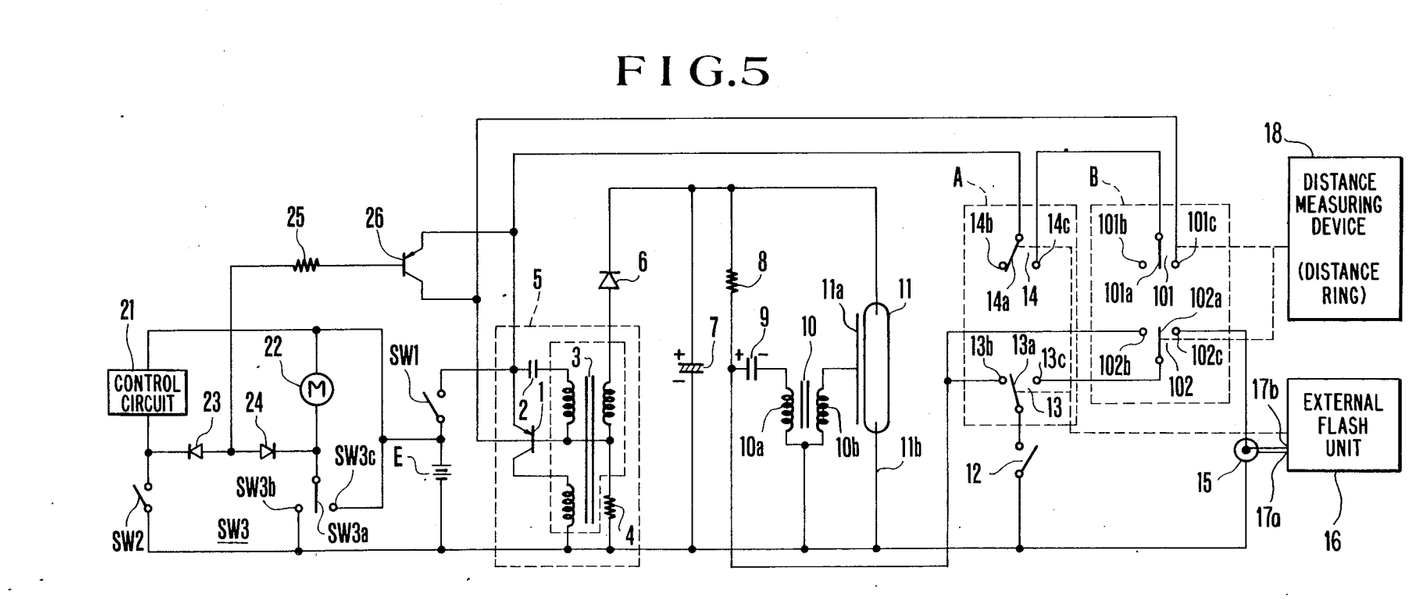
FIG. 5 is a circuit diagram showing a fourth embodiment of the invention.

FIG. 5 is a circuit diagram showing a flash unit incorporating camera as a further embodiment example of the invention. This embodiment includes switches 101 and 102 in addition to the arrangement of the preceding example of embodiment shown in FIG. 4. FIG. 5 shows these switches 101 and 102 encompassed with a broken line B. These switches 101 and 102 are arranged to be responsive either to a signal from a distance measuring device 18 or alternately, to a distance ring of a lens. The switch 101 consists of a moving contact piece 101a and fixed terminals 101b and 101c. The fixed terminal 101b is in an open state. The moving contact piece 101a and the fixed terminal 101c are connected between the fixed terminal 14c of the switch 14 and the base of the transistor 1 by cutting a line which is connecting the terminal 14c to the base of the transistor 1 in the case of FIG. 4. The other switch 102 consists of a moving contact piece 102a and fixed terminals 102b and 102c. The fixed terminal 102b is connected to the fixed terminal 13b of the switch 13. The moving contact piece 102a and the fixed terminal 102c are connected between the fixed terminal 13c and the external synchronizing terminal 15 by cutting a line which connects the fixed terminal 13c to the external synchronizing terminal 15 in the case of FIG. 4. The switching operations of the switches 101 and 102 are as follows: In case where an object to be photographed is located at a relatively short distance and an adequate exposure can be expected from the use of the flash unit shown in FIG. 5, the moving contact pieces 101a and 102a are connected, respectively, to the fixed terminals 101b and 102b. If the object to be photographed is located at a relatively long distance and an adequate exposure is hardly expectable from the use of the flash light quantity available from the flash unit of FIG. 5, the moving contact pieces 101a and 102a are connected, respectively, to the fixed terminals 101c and 102c.

Next, the following description of the operation of the embodiment shown in FIG. 5 deals mainly with the different points of the embodiment from the preceding example of embodiment shown in FIG. 4: In case where the external flash unit 16 of a larger flashing capacity than the internal flash unit shown in FIG. 5, is not mounted on the camera, the switches 13 and 14 have their moving contact pieces 13a and 14a connected, respectively, to their fixed terminals 13b and 14b. The synchronizing switch 12 is connected only to the internal flash unit shown in FIG. 5 and is not connected to the external synchronizing terminal 15. Further, the part between the base and emitter of the transistor 1 is not short-circuited. Therefore, photographing is performed with the internal flash unit shown in FIG. 5 in the same manner as in the case of the flash unit of FIG. 4.

In the event that the external detachable flash unit 16 is mounted on the camera while the photographing object is located at a relatively short distance to permit an adequate exposure of the film with the flash light quantity available from the internal flash unit of FIG. 5, the leg part 17 of the external detachable flash unit 16 (see FIG. 2) comes to connect the moving contact piece 14a of the switch 14 to the fixed terminal 14c thereof. However, since the moving contact piece 101a of the switch 101 is connected to the fixed terminal 101b, the part between the base and emitter of the transistor 1 is not short-circuited in this instance. Meanwhile, the moving contact piece 13a of the switch 13 and the moving contact piece 102a of the switch 102 are also caused by the leg part 17 of the detachable flash unit (FIG. 2) to connect, respectively, with the fixed terminals 13c and 102b. As a result of that, the synchronizing switch 12 is connected to the flash unit of FIG. 5 and is separated from the external synchronizing terminal 15. In this instance, therefore, photographing is performed with the flash unit of FIG. 5.

In case where the above-stated external detachable flash unit 16 is mounted on the camera while the photographing object is located at a relatively long distance and an adequate exposure of film is hardly expectable from the flash light quantity available from the internal flash unit shown in FIG. 5 or, in other words, in the case of the distance A mentioned in the foregoing, the embodiment operates as follows: The moving contact piece 14a of the switch 14 is connected to the fixed terminal 14c thereof. The moving contact piece 101a of the switch 101 is caused to connect with the fixed terminal 101c thereof by the rotation of a known distance ring 18. The distance ring 18 is provided with a member (not shown) which is arranged to cause the moving contact pieces 101a and 102a of the switches 101 and 102 to connect with the fixed terminals 101c and 102c, respectively, when the distance ring 18 is rotated to a position corresponding to the above-stated distance A. This causes a short-circuit between the base and emitter of the transistor 1 to bring the operation of the oscillating booster circuit 5 to a stop. Further, the moving contact piece 13a of the switch 13 is connected to the fixed terminal 13c thereof. The moving contact piece 102a of the switch 102 is connected to the fixed terminal 102c. As a result, the synchronizing switch 12 is separated from the internal flash unit of FIG. 5 and is connected to the external synchronizing terminal 15. Therefore, photographing is accomplished with the external detachable flash unit 16 in this case.

In accordance with this invention, a compact camera of the kind incorporating an internal flash unit therein can be liberated from a limited photographable distance range for flash photography by virtue of the arrangement to permit use of an external detachable flash unit of a larger flashing capacity then the internal incorporated flash unit. Further, in the specific embodiment examples given, the internal flash unit is arranged to be rendered inoperative while the external flash unit 16 in use. This saves the electrical power from being wasted. For photographing at a short distance, the camera is shiftable from the use of the external flash unit 16 to the use of the internal flash unit. The arrangement also contributes to minimization of unnecessary power consumption. Further, the use of a large external detachable flash unit 16 of the serial control type for an increased flash light quantity permits a continuous photographing operation by virtue of reduction of charging time to a value much shorter than the charging time required for a small flash unit. This lessens the possibility of missing shutter chances due to long waiting time for completion of a charging process.

What I claim:

1. A flash unit incorporated in a camera permitting a detachable flash unit to be mounted thereon, comprising:
    (A) electric load means for the camera; and
    (B) an internal flash unit including:
    (a) light generating means for emitting light to illuminate an object in response to a trigger signal;
    (b) trigger signal producing means connected between the light generating means and a synchronous switching means for generating the trigger signal upon actuation of the synchronous switching means;
    (c) an external synchronizing terminal connected to a trigger circuit of the detachable flash unit for transmitting a synchronous signal which is produced upon actuation of the synchronous switching means;
    (d) supply means for applying electric energy from a source to the internal flash unit and the electric load means; and
    (e) control means responsive to outputs of a distance measuring device for allowing transmission of the synchronous signal to the trigger circuit of the detachable flash unit and rendering said internal flash unit inoperative when the distance measuring device produces a signal indicating a long distance.

2. A flash unit according to claim 1, wherein said control means is connected in series between said synchronous switching means and said external synchronizing terminal.

3. A flash unit according to claim 1, wherein said control means is arranged to allow the synchronous signal to be transmitted to the trigger circuit of the detachable flash unit and to inhibit the transmission of the synchronous signal to said trigger signal producing means when the distance measuring device produces a signal indicating the long distance.

4. A flash unit incorporated in a camera permitting a detachable flash unit to be mounted thereon, comprising:
    (A) electric load means for the camera; and
    (B) an internal flash unit including:
    (a) light generating means for emitting light energy to illuminate an object in response to a trigger signal;
    (b) power source means for generating an electrical energy to be converted into the light energy in the light generating means;
    (c) trigger signal producing means connected between the light generating means and a synchronous switching means for generating the trigger signal upon actuation of the synchronous switching means;
    (d) an external synchronizing terminal connected to a trigger circuit of the detachable flash unit for transmitting a synchronous signal which is produced upon actuation of the synchronous switching means;
    (e) supply means for applying electric energy from a source to the power source means and the electric load means; and
    (f) control means responsive to outputs of a distance measuring device for allowing the synchronous signal to be transmitted to the trigger circuit of the detachable flash unit and rendering said power source means inoperative when the distance measuring device outputs a signal indicating a long distance.

5. A flash unit according to claim 4, wherein said control means is connected in series between said synchronous switching means and said external synchronizing terminal.

6. A flash unit according to claim 4, wherein said control means allows the synchronous signal to be transmitted to the trigger circuit of the detachable flash unit and inhibits the transmission of the synchronous signal to said trigger signal producing means when the distance measuring device produces a signal indicating a long distance.

7. For a camera having a synchronizing switch, and which permits an auxiliary flash unit to be mounted thereon, an internal flash unit, comprising:
    light generating means for emitting light to illuminate an object in response to a trigger signal;
    trigger signal producing means responsive to the synchronizing switch and connected to the light generating means for generating the trigger signal;
    a synchronizing terminal responsive to the synchronizing switch and connectably to the detachable flash unit for transmitting a synchronous signal;
    supply means for supplying electric energy from a source to the internal flash unit; and
    control means responsive to outputs of a distance measuring device for allowing transmission of the synchronous signal to the synchronizing terminal and rendering the internal flash unit inoperative when a distance measuring device produces a signal indicating a distance longer than a predetermined distance.

8. A flash unit as in claim 7, wherein said control means is coupled between said synchronous switch and said synchronizing terminal.

9. A flash unit as in claim 7, wherein said control means is arranged to inhibit transmission of the synchronous signal to said trigger signal producing means when the distance indicator produces a signal indicating a distance longer than the predetermined distance.

10. For a camera having a synchronizing switch, and a distance measuring device for producing distance signals, and which permits a detachable flash unit to be mounted thereon, an internal flash unit incorporated in the camera comprising:
light generating means for emitting light energy to illuminate an object in response to a trigger signal;
energy storage means for storing electrical energy to be converted into light energy by the light generating means;
trigger signal producing means, responsive to the synchronizing switch, for generating a trigger signal in response to a synchronous signal from the synchronous switch;
a synchronizing terminal, responsive to the synchronous switch and connectable to the detachable flash unit, for transmitting the synchronous signal; and
control means, responsive to the distance measuring device, for allowing the synchronous signal to be transmitted to the detachable flash unit and for disabling said light generating means when the distance measuring device measures a distance longer than a predetermined distance.

11. A flash unit as in claim 10, wherein said control means responds to the synchronizing switch and is connected to said synchronizing terminal.

12. A flash unit as in claim 10, wherein said control means is arranged to inhibit transmission of the synchronous signal to the trigger producing means when the distance indicator indicates a distance longer than the predetermined distance.

13. For a camera having a synchronizing switch, and a distance measuring device for producing distance signals, and which permits a detachable flash unit to be mounted thereon, a flash system, comprising:
a first flash unit including:
light generating means for emitting light to illuminate an object in response to a trigger signal; and
trigger signal producing means responsive to said synchronizing switch and connected to said light generating means for generating a trigger signal upon actuation of the synchronizing switch;
a second flash unit including:
second light generating means;
a trigger circuit for triggering said second light generating means; and
control means responsive to an output of the distance measuring device for allowing a synchronous signal from the synchronizing switch to be transmitted to the trigger circuit of the second flash unit and for disabling said first light generating means when the distance measuring device produces a signal indicating a distance longer than a predetermined distance.

14. A camera comprising:
(a) a synchronizing switch;
(b) a synchronizing terminal connectable to a detachable flash unit for transmitting a synchronous signal from the synchronizing switch;
(c) an internal flash unit to emit light energy to illuminate an object in response to the synchronous signal; and
(d) control means for disabling said internal flash unit when said detachable flash unit is mounted on the camera.

15. A camera comprising:
(a) a synchronous switch;
(b) a synchronous terminal connectable to a detachable flash unit for transmitting a synchronous signal from the synchronizing switch;
(c) electric load means;
(d) an internal flash unit to emit light energy to illuminate an object in response to the synchronous signal;
(e) supply means for applying electric energy from a source to said electric load means and said internal flash unit; and
(f) control means for disabling said internal flash unit when said detachable flash unit is mounted on the camera.

16. A camera according to claim 15, wherein said electric load means includes a film winding motor for receiving electric energy from the source.

* * * * *